US 6,634,113 B1

(12) United States Patent
Almaraz et al.

(10) Patent No.: US 6,634,113 B1
(45) Date of Patent: Oct. 21, 2003

(54) TILT SENSOR AND METHOD OF FORMING SUCH DEVICE

(75) Inventors: Jose L Almaraz, Chihuahua (MX); Pedro G Mireles, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/150,707

(22) Filed: May 17, 2002

(51) Int. Cl.[7] .................................................. G01C 9/06
(52) U.S. Cl. ..................................................... 33/366.11
(58) Field of Search ........................ 33/366.11, 366.12, 33/366.25, 366.26; 324/207.11, 207.13, 207.22

(56) References Cited

U.S. PATENT DOCUMENTS

| 5,107,710 A | | 4/1992 | Huck et al. |
| 5,357,807 A | * | 10/1994 | Guckel et al. ................ 73/721 |
| 5,490,421 A | | 2/1996 | Ueyanagi |
| 5,522,266 A | | 6/1996 | Nicholson et al. |
| 5,528,935 A | | 6/1996 | Welch et al. |
| 5,614,678 A | | 3/1997 | Kurtz et al. |
| 5,680,708 A | * | 10/1997 | James ...................... 33/366.12 |
| 5,684,456 A | | 11/1997 | Walter |
| 5,702,619 A | | 12/1997 | Kurtz et al. |
| 5,866,818 A | | 2/1999 | Sumi et al. |
| 5,959,214 A | | 9/1999 | Vaidyanthan et al. |
| 5,983,727 A | * | 11/1999 | Wellman et al. ............... 73/724 |
| 6,082,200 A | * | 7/2000 | Aslam et al. ................. 73/774 |
| 6,301,795 B1 | * | 10/2001 | Kang ...................... 33/366.12 |

* cited by examiner

Primary Examiner—Christopher W. Fulton
(74) Attorney, Agent, or Firm—Margaret A. Dobrowitsky

(57) ABSTRACT

Tilt sensor and method for forming the sensor with a piezoresistive membrane having a weight affixed proximate its center for detecting the tilt of a body. The membrane may include four piezoresistors placed proximate the edges of the membrane at the points of maximum stress when the membrane is subject to a uniform applied pressure. The piezoresistors may form a Wheatstone bridge circuit to generate an output voltage in response to changes in resistance of the piezoresistors under the uniform applied pressure. The output voltage may be indicative of the angle of inclination of a body. The membrane may be fabricated from a silicon wafer using known photolithography and etching processes. The membrane may be connected with a voltage source and secured within an appropriate housing to be placed in an operational environment.

20 Claims, 2 Drawing Sheets

TILT SENSOR AND METHOD OF FORMING SUCH DEVICE

BACKGROUND OF THE INVENTION

The present invention relates in general to sensors and in particular to a piezoresistive membrane having a centered weight for detecting angular or relative displacement such as for detecting the tilt of a body.

Many tilt sensors are of the electrolytic type. A typical electrolytic sensor includes a glass or ceramic envelope that is partially filled with a conductive fluid. The fluid moves in response to tilting of the sensor where the fluid is under the influence of gravity, such as with a carpenter's spirit level. In other embodiments the fluid may be under the influence of the acceleration of a body. Platinum contacts may be sealed flush with the inside walls of the envelope. When such a sensor is at its zero position the electrical impedance of the fluid from the center electrode to each of the left and right electrodes is equal. Tilting the sensor disturbs this balanced condition and the impedance changes in proportion to the tilt angle. Cost and size of a typical electrolytic sensor limit their use in certain environments. Many electrolytic sensors are sensitive to temperature change and temperature compensation needs to be provided in most of the signal conditioning electronic units. Also, with respect to glass electrolytic sensors, great care must be afforded to the thermal and mechanical stress related characteristics of glass during installation and alignment. This may limit the range of applications of such sensors.

Another known category of tilt sensor types is switch sensors, which may be a variation of an electrolytic sensor. A switch type tilt sensor doesn't use a linear output with respect to inclination angle. Instead, a signal is generated once the inclination reaches a predetermined threshold.

While not used specifically for detecting the tilt of a body, a common structure for measuring pressure are pressure transducers. Pressure transducers may be diaphragm-based transducers that convert an applied pressure into stresses in the plane of the diaphragm. The stresses may be measured and converted into electrical signals by use of piezoresistive sensors that are an integral part of the diaphragm. Depending on the application, the diaphragm may be fabricated of metal or a semiconductor material such as silicon. Such configurations are known to be used in microphones, the automotive industry such as for checking tire, gas and air pressure, the biomedical industry such as for determining blood and fluid pressure, various instrumentation and vacuum sensing. The piezoresistive effect varies as a function of the structure of the silicon's crystal lattice. Resistance in particular is dependent on changes in length and resistivity of the piezoresistor caused by stress. The following equation applies:

$$R = \frac{rL}{A}$$

R = resistance
L = length
r = reistivity
A = area

The relationship between stress and resistance change for silicon may be expressed by:

$$\frac{\Delta R}{R} = \pi_L \sigma_L + \pi_T \sigma_T \tag{1}$$

R = Resistance
$\Delta R$ = Resistance change
$\pi_L$ = Longitudinal piezoresistive coefficient
$\pi_T$ = Transverse piezoresistive coefficient
$\sigma_L$ = Longitudinal stress
$\sigma_T$ = Transverse stress Equation (1) includes two piezoresistive coefficients $\pi_L$ and $\pi_T$. These two piezoresistive coefficients are longitudinal and transverse as indicated by their respective subscripts. The longitudinal piezoresistive coefficient relates the relative resistance change due to an applied stress in a piezoresistive element when the stress is in the same direction as the current flow through the element. The transverse piezoresistive coefficient relates the relative resistance change due to an applied stress in a piezoresistive element when the stress is at right angles to the current flow through the elements. It should be noted that the transverse piezoresistive coefficient could be defined for a stress in the plane of the sensor as well as for a stress normal to that plane.

The change in resistance of the piezoresistive elements, or piezoresistors, can be used to create a voltage output by means of a conventional Wheatstone bridge circuit. In this respect, the resistance in the bridge legs changes in response to pressure applied to a diaphragm, for example, of which the piezoresistors are an integral part. A known configuration for such an arrangement may be semiconductor devices with the resistive bridge legs formed such as by appropriate doping of selected portions of material in the semiconductor material. For example, U.S. Pat. No. 5,614,678 discloses a device using semiconductor material that is lightly doped N- or P-type silicon in a portion of the crystallographic plane. The piezoresistive elements of that device may be fabricated from P+ or P++ silicon in the crystallographic plane using known techniques. The piezoresistive sensing elements may be arranged in a Wheatstone bridge circuit so that two piezoresistors are positive changing and the other two are negative changing. The disclosed arrangement allows for an output voltage to be generated, which is indicative of an applied pressure on the device.

Considering the cost and size advantages of using a semiconductor sensor relative to known tilt sensor types such as an electrolytic sensor, for example, it would be advantageous to provide a low cost semiconductor sensor for detecting tilt that could be adapted for a range of environments such as those requiring small scales in size.

BRIEF SUMMARY OF THE INVENTION

An exemplary embodiment of a sensor for detecting tilt of the present invention takes advantage of the crystallographic structure and piezoresistive effect in semiconductor materials. Such a tilt sensor may include a membrane where a plurality of piezoresistors may be diffused onto the membrane. A weight may be integral to the membrane and placed near the membrane's center. In one exemplary embodiment four piezoresistors are diffused onto or formed integral with the membrane to form a conventional Wheatstone bridge circuit. A constant voltage input may be applied to the membrane. A change in resistance of one or more of the piezoresistors may be used to create a voltage output by means of the Wheatstone bridge. The voltage output from the Wheatstone bridge may be responsive to the angular displacement or tilt of the membrane from a reference position such as horizontal. The voltage output at any point in time from the Wheatstone bridge may be indicative of the stresses incurred by the membrane due to the membrane's tilting. This may allow for a qualitative or quantitative measurement of the membrane's angular displacement or tilt.

In one exemplary embodiment of the present invention two piezoresistors may be placed within the membrane perpendicularly or transverse to an applied stress and the other two may be placed parallel or longitudinally to the applied stress. The piezoresistors may be placed in locations that allow for maximum sensitivity of the sensors. This may be at or near the edges of the membrane where maximum stress occurs under an applied pressure. Sensor sensitivity may be defined as the ratio of change of voltage output to applied pressure. With no stress applied to the membrane in this configuration the voltage output is zero. As the applied pressure or stress is increased the voltage output will increase allowing for a determination of the membrane's angular displacement or tilt. One advantage of this configuration is that resistance changes resulting from temperature variations tend to cancel each other. In this respect, the sensor is at least partially immune to the effects of temperature.

The membrane according to one aspect of the present invention may be selected to have an appropriate thickness so that at least a portion of it will deflect in response to an applied pressure caused by a weight proximate the center of the membrane when the membrane is tilted. The deflection may stress the piezoresistors thereby changing their respective resistance value. A Wheatstone bridge circuit may be used to transform the changes in resistance value into a voltage output, which may be indicative of the amount the membrane has tilted. The composition of at least a portion of the membrane may be substantially of silicon or a silicon-based alloy provided that electrical isolation is achieved among the piezoresistors. The weight may be composed of a variety of suitable materials such as copper or nickel, for example, and be affixed or secured to the membrane by known techniques such as bonding or electrodeposition, for example.

One advantage of tilt sensors in accordance with the present invention is that exemplary embodiments may be fabricated in varying sizes. Empirical simulation using commercially available finite element analysis software such as software from Ansys, Inc. demonstrates that the dimensions of the membrane and weight vary in proportion to one another and may consequently be adapted for a wide range of applications requiring specific size sensors.

DETAILED DESCRIPTION OF THE INVENTION

Figure 1:
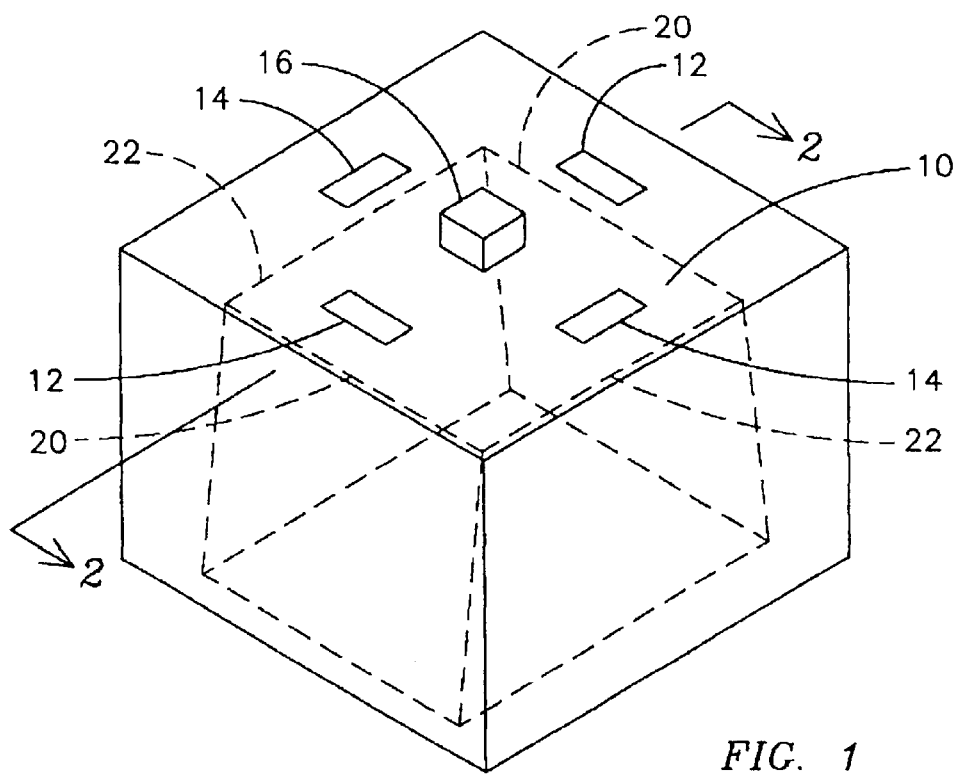
FIG. 1 is a perspective view of an exemplary embodiment of the present invention.

FIG. 1 illustrates an exemplary embodiment of a membrane 10 of the present invention. Membrane 10 may be fabricated from a silicon wafer such as a polysilicon, amorphous silicon or single crystal silicon, for example, using known techniques such as photolithography and/or etching processes. Membrane 10 may have pairs of piezoresistive elements, or piezoresistors, 12 and 14, fabricated therein using conventional techniques. At least a portion of membrane 10 may be fabricated to deflect in response to the application of a uniform pressure applied to the membrane 10. This deflection may cause stress on the piezoresistors 12 and 14, which changes their resistance values. The membrane 10 may be fabricated to have a thickness in the range of about 10 to 50 $\mu$m for a 1000 $\mu$m square membrane 10. One aspect of the present invention allows for the thickness to vary as a function of the membrane's 10 dimensions. In one exemplary embodiment of the present invention membrane 10 has a thickness of approximately 20 $\mu$m. The thickness of membrane 10 may be selected as a function of a pressure range to be exerted on the membrane 10 during use. For example, empirical simulation conducted by the assignee of the present invention demonstrates by plotting pressure vs. deflection curves proximate the center of the membrane 10 that membrane 10, assuming a maximum deflection of 0.5 times the thickness of membrane 10, having a thickness of 20 $\mu$m establishes a practical pressure range for use of approximately 0 KPa to 961 KPa. Similarly, empirical simulation demonstrates that a membrane 10 having a thickness of 30 $\mu$m establishes a practical pressure range for use of approximately 0 KPa to 3200 KPa. These pressure ranges are well below the yield strength of silicon, for example, which is approximately 7000 MPa and defines the burst pressure of membrane 10 if fabricated of silicon. Consequently, one aspect of a method of the present invention allows for selecting a thickness for membrane 10 depending on the pressure range desired for a specific application of the tilt sensor.

Figure 3:
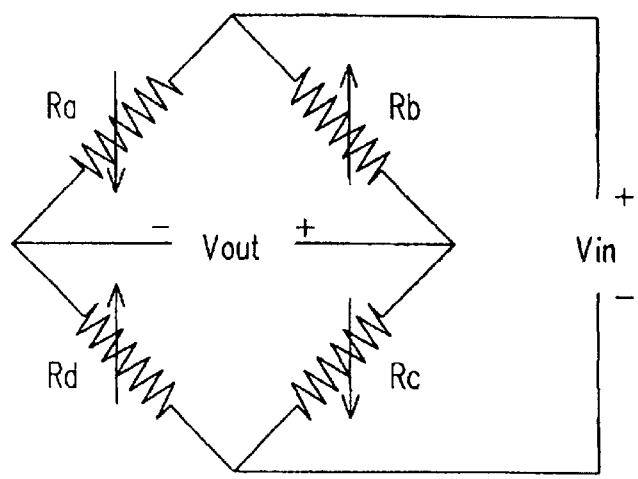
FIG. 3 is a schematic diagram of a Wheatstone bridge circuit used an exemplary embodiment of the present invention.

The pairs of piezoresistors 12 and 14 may be fabricated within membrane 10 using known techniques such as photolithography and/or etching processes. Piezoresistors 12 and 14 may be placed within the membrane 10 at locations where the maximum stress occurs in membrane when subjected to a uniform pressure such as a uniform pressure applied normal to the upper surface 18. The piezoresistors 12 and 14 may be arranged to form a Wheatstone bridge circuit illustrated in FIG. 3. The change in resistance of the piezoresistors 12 and 14 caused by stress in membrane 10 may be used to create an output voltage. The transfer function for the circuit of FIG. 3 is defined by:

$$V_{out} = V_{in}\left(\frac{Rc}{Rb+Rc} - \frac{Rd}{Ra+Rd}\right)$$

Where Ra, Rb, Rc and Rd represent the resistors shown in FIG. 3. $V_{in}$ represents a voltage input, which may be constant, and $V_{out}$ represents a voltage output from the Wheatstone bridge circuit. A power source may be provided to supply the voltage input and may be a D.C. voltage of 2, 5 or 10 volts, for example. In one exemplary embodiment of the present invention the first pair of piezoresistors 12 are formed within membrane 10 perpendicular or transverse to the stress caused by a uniform pressure and the second pair of piezoresistors 14 are formed within membrane 10 to be parallel or longitudinal with the stress. This arrangement allows for the first pair of piezoresistors 12 to decrease in value and the second pair 14 to increase in value when the membrane 10 is under an applied uniform pressure. This relationship allows for the membrane 10 to be substantially immune from the affects of temperature. Any resistance change due to temperature should be cancelled because of the transfer function equation.

In one exemplary embodiment of the present invention, using Miller Indices notation, the piezoresistors 12 and 14 are aligned along the <110> direction and the silicon wafer surface (100), which forms a part of the upper surface 18 of membrane 10. Each of the first pair of piezoresistors 12, which are placed transverse to the stress, may have a width that allows for each one to be very close to an edge 20 of the membrane 10. The thickness of each pair 12 and 14 may be selected in order to have most of each piezoresistor as close to the upper surface 18 as possible and as far away from the midpoint of the membrane 10 thickness so that all piezoresistors are subjected only to tensile stress. The length of each of the first pair 12 and second pair 14 may be selected so that the resulting resistor value is approximately 4000 Ω to ensure that the current is not too large and so that the piezoresistors are not subject to too much heat. Alternate embodiments may use piezoresistors with other resulting resistor values depending on the specific application. Each of the second pair of piezoresistors 14, which are placed longitudinal to the stress, may be formed of two piezoresistors in series to minimize the distance from an edge 22 of the membrane 10, which maximizes the sensitivity per unit volume of the silicon membrane 10. This sensitivity may be defined as a change in voltage output in response to an input pressure. The length and width of each pair 14 may be selected to make the absolute resistance value equal to the value for the pair of transverse piezoresistors 12. Setting these resistance values equal allows for the output voltage to be zero when there is zero stress applied to the piezoresistors 12 or 14. The body of each pair of piezoresistors 14 may be kept close to an edge 22 where membrane 10 experiences maximum stress.

For example, in one exemplary embodiment of the present invention membrane 10 may be 1000 $\mu$m×1000 $\mu$m×20 $\mu$m with each of the transverse pair of piezoresistors 12 being approximately 100 $\mu$m×25 $\mu$m×2 $\mu$m and each of the longitudinal pairs being approximately 50 $\mu$m×25 $\mu$m×2 $\mu$m. In another embodiment the dimensions are the same except the membrane 10 is 30 $\mu$m thick. The weight 16 may have a range of masses for these dimensions depending on the specific application.

Figure 2:
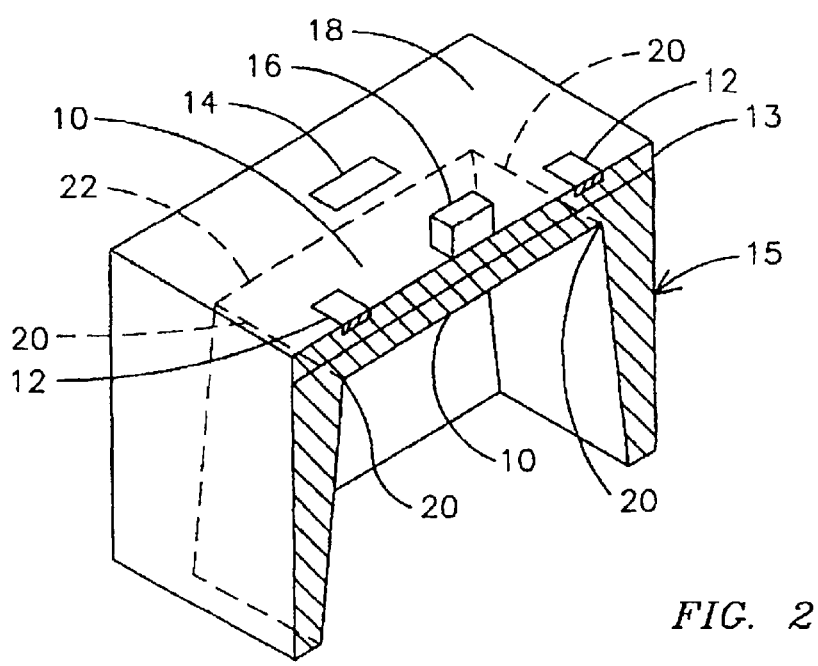
FIG. 2 is a cross sectional view of the exemplary embodiment of FIG. 1 taken along line 2—2 situated on a die or substrate.

The membrane 10 may be fabricated from the silicon wafer to form an upper layer 13 of a die or substrate, which is generally referred to as 15 as best shown in FIG. 2. The membrane 10 may be formed having a range of dimensions and shapes as will be recognized by those skilled in the art. A plurality of dies 15 may be fabricated from one silicon wafer using known techniques. A singulation step may be performed to separate the plurality of dies 15 as part of the fabrication process to form individual sensors. The die 15 may be fabricated with N-type dopant as is known in the art to provide electrical isolation among the piezoresistors 12 and 14, which may be fabricate with P-type dopant. In one exemplary embodiment of the present invention the piezoresistors 12 and 14 may be doped with boron at a doping concentration of approximately $1 \times 10^{17}$ atoms/cm$^3$. With this doping concentration of boron the transverse and longitudinal piezoresistive coefficients are almost the same with opposite signs. For example, the longitudinal piezoresistive coefficient may be about $71.8 \times 10^{-11}$/Pa and the transverse coefficient may be about $66.3 \times 10^{-11}$/Pa in the case of a silicon membrane 10. Also, with this doping concentration of boron the piezoresistive factor is equal to one so the piezoresistive coefficients given can be used without any correction. A doping concentration of boron atoms on at least a portion of a lower surface of the membrane 10 may be approximately $7 \times 10^{19}$/cm$^3$ to provide for an effective back etch stop. The silicon density of the die 15 and the membrane 10 may be about $2.27 \times 10^3$ Kg/m$^3$.

One exemplary embodiment of the present invention allows for membrane 10 to be substantially square having length and width equal to approximately 1000 $\mu$m. Other dimensions may be used depending on the specific application. A weight 16 may be affixed to an upper surface 18 of membrane 10 by conventional techniques such as by using an appropriate adhesive, bonding or electrodeposition, for example. Weight 16 may be comprised of a range of suitable materials such as lead, gold, silver, copper, nickel or other metals or metal alloys, for example. In one exemplary embodiment weight 16 is substantially square and affixed to the upper surface 18 at or near the geometrical center of the membrane 10. In alternate embodiments the weight 16 may assume other shapes and at least a portion of it may be embedded in the upper surface 18 to help secure it in place. The weight 16 may be affixed to the membrane 10 before or after the singulation step of the wafer fabrication process. In an alternate embodiment the weight 16 may be fabricated as part of membrane 10 so that a portion of the weight 16 is above the upper surface 18.

Figure 4:
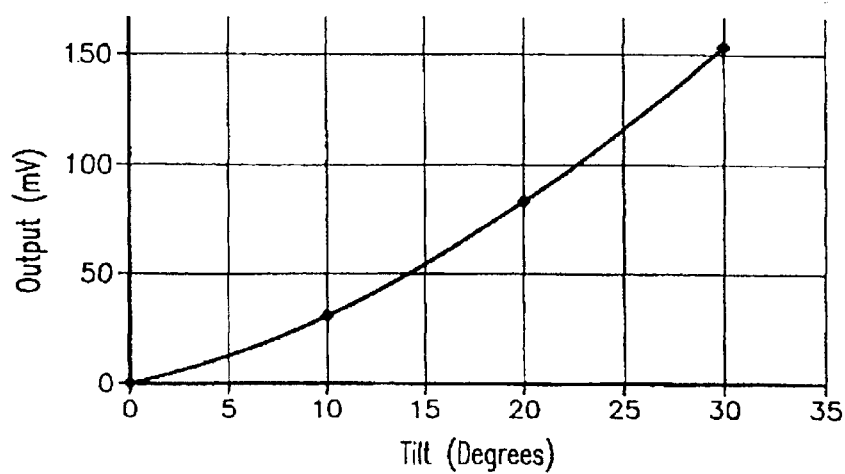
FIG. 4 is a graphical representation of the proportional response from the exemplary embodiment of FIG. 1 to changes in tilt angle.

Empirical simulations conducted by the assignee of the present invention demonstrate that for a membrane 10 with the dimensions of 500 $\mu$m×500 $\mu$m×30 $\mu$m having a 51 gram weight applied proximate to its center and with the membrane 10 having an elastic modulus of 169 MPa, a Poisson's ratio of 0.279 and a tensile strength of approximately 7000 MPa the stress concentrations along a portion of the edges 20 and 22 of the membrane 10 varied in response to a change in the angle of inclination of the member 10. The simulation demonstrates that as the angle of inclination from a reference position, such as horizontal, for example, increases the stress concentration decreases proportionately. The graph of FIG. 4 shows the proportional relationship between output voltage and the tilt of membrane 10 in degrees. Also, as the dimensions of the member 10 increase the mass of weight 16 may decrease.

The die or substrate 15 may be situated within a housing (not shown) so that the membrane 10 may be connected to known electronics for applying a voltage input across the piezoresistors 12 and 14. A variety of means are known in the art for reading and determining the output voltage signals in response to changes in resistance of the piezoresistors 12 and 14. Means are also well known for displaying the output voltage signal in terms of an angle of inclination, whether discrete values, threshold values or otherwise.

While the preferred embodiments of the present invention have been shown and way of example only. Numerous variations, changes and substitutions will occur to those of skill in the art without departing from the invention herein. Accordingly, it is intended that the invention be limited only by the spirit and scope of the appended claims.

What is claimed is:

1. A tilt sensor comprising:
   a substrate;
   a membrane formed within the substrate, the membrane having an upper surface and adapted to receive an input voltage from a voltage source;
   a plurality of piezoresistors formed within the membrane, the plurality of piezoresistors configured to generate an output voltage signal in response to a pressure applied to at least a portion of the membrane; and
   a weight disposed on the upper surface, the weight adapted to apply the pressure when the substrate is at an angle of inclination relative to a reference position, wherein the output voltage signal is indicative of the angle of inclination of the substrate.

2. The tilt sensor of claim 1, the plurality of piezoresistors comprising:

a first pair of piezoresistors; and a second pair of piezoresistors.

3. The tilt sensor of claim 2 wherein:

each of the first pair of piezoresistors is in a longitudinal position relative to an applied stress resulting from the pressure; and each of the second pair of piezoresistors is in a transverse position relative to the applied stress.

4. The tilt sensor of claim 3 wherein:

a first one of the first pair of piezoresistors is located proximate a first edge of the membrane and a second one of the first pair of piezoresistors is located proximate a second edge of the membrane; and a first one of the second pair of piezoresistors is located proximate a third edge of the membrane and a second one of the second pair of piezoresistors is located proximate a fourth edge of the membrane.

5. The tilt sensor of claim 3 wherein:

the first pair of piezoresistors each comprising two piezoresistors coupled in series circuit.

6. The tilt sensor of claim 1 wherein the plurality of piezoresistors are formed proximate the upper surface of the membrane so that each of the piezoresistors is essentially subject to a tensile stress resulting from the pressure.

7. The tilt sensor of claim 1 wherein the weight is disposed proximate a center portion of the upper surface.

8. The tilt sensor of claim 1 wherein each of the plurality of piezoresistors is doped with boron at a concentration on the order of approximately $1\times10^{17}$ atoms/cm$^3$.

9. The tilt sensor of claim 1 wherein the substrate and the membrane each has a silicon density on the order of approximately $2.27\times10^3$ Kg/m$^3$.

10. The tilt sensor of claim 1 wherein a portion of the weight is embedded within the upper surface of the membrane.

11. An apparatus for use as a sensor for detecting the angle of inclination of a body relative to a reference position, the apparatus comprising:

a substrate affixed within the body and in electrical communication with an input voltage;

a first portion of the substrate adapted to deflect in response to an applied pressure on the substrate;

a weight disposed on an upper surface of the substrate, the weight adapted to exert the applied pressure when the body is at an angle of inclination relative to the reference position;

a plurality of piezoresistors disposed within the first portion and adapted to generate at least one output voltage signal in response to the first portion of the substrate deflecting; and means for reading the at least one output voltage signal, the at least one output voltage signal being indicative of the angle of inclination.

12. The apparatus of claim 11 wherein the plurality of piezoresistors are disposed within at least one area of a maximum stress within the first portion, the maximum stress being caused by the applied pressure.

13. The apparatus of claim 11 wherein a first pair of the plurality of piezoresistors is placed longitudinal to a direction of a stress induced by the weight when the body is at the angle of inclination and a second pair of the plurality of piezoresistors is placed perpendicular to the stress.

14. The apparatus of claim 11, the substrate comprising a silicon wafer having a surface wherein each of the plurality of piezoresistors are aligned along the <110> direction and the silicon wafer surface (100).

15. The apparatus of claim 11 wherein at least one of the plurality of piezoresistors is doped with boron at a concentration of approximately $1\times10^{17}$ atoms/cm$^3$.

16. The apparatus of claim 11 wherein the weight is disposed proximate a center portion of the upper surface.

17. A method for detecting the angle of inclination of a body relative to a reference position comprising the steps of:

providing a substrate at least a portion of which will deflect in response to the application of a pressure;

determining the areas of maximum stress in the substrate caused by the pressure;

forming a plurality of piezoresistors within the substrate proximate the areas of maximum stress, the plurality of piezoresistors forming a Wheatstone bridge circuit that will generate at least one output voltage signal in response to changes in resistance of the piezoresistors;

affixing a weight to an upper surface of the substrate, the weight adapted to exert the pressure when the substrate is at an angle of inclination relative to the reference position;

providing an input voltage to the substrate; and reading the at least one output voltage signal, the at least one output voltage signal being indicative of the angle of inclination.

18. The method of claim 17, the step of affixing the weight comprising placing the weight proximate a center portion of the upper surface.

19. The method of claim 17 further comprising the step of selecting a thickness of the substrate based on a desired pressure range for use of the sensor.

20. The method of claim 17 further comprising the step of providing means for displaying the angle of inclination.

* * * * *